United States Patent [19]

Lunden et al.

[11] 4,324,521
[45] Apr. 13, 1982

[54] STICKER PLACING APPARATUS

[75] Inventors: Sidney L. Lunden; Larry A. Gillingham, both of Spokane, Wash.

[73] Assignee: Lunden Industries, Inc., Spokane, Wash.

[21] Appl. No.: 190,449

[22] Filed: Sep. 24, 1980

[51] Int. Cl.³ ............................................. B65G 57/26
[52] U.S. Cl. ..................................... 414/42; 198/488; 414/83; 414/750
[58] Field of Search ................... 414/42, 83, 567, 750; 198/488

[56] References Cited

U.S. PATENT DOCUMENTS

| | | | |
|---|---|---|---|
| 1,490,594 | 4/1924 | De Lateur | 414/42 X |
| 3,860,128 | 1/1975 | Lunden | 414/42 |
| 3,904,044 | 9/1975 | Lunden | 414/42 X |
| 3,904,047 | 9/1975 | Lunden | 414/42 |
| 4,090,618 | 5/1978 | Lehmann | 414/42 X |
| 4,253,787 | 3/1981 | Lunden et al. | 414/42 |

Primary Examiner—Leslie J. Paperner
Attorney, Agent, or Firm—Wells, St. John & Roberts

[57] ABSTRACT

A sticker placing apparatus is described for automatically feeding stickers for placement between board layers on a lumber stack. The stickers are delivered to selected sticker stations to one side of the stack by an elongated conveyor. The present placing apparatus then functions to lift select stickers from the sticker stations on the conveyor, upward and laterally to sticker transfer positions where the sticker can be moved to positions under a layer of boards being placed on the stack. The stickers are pivoted up and laterally from the stations to the transfer positions by pivoted sticker supports on a linearly reciprocating carriage. Cam mechanisms on the frame and followers on the sticker supports cause elevational movement of the supports in response to reciprocating motion of the carriage. The individual cam mechanisms can be made inoperative by a lockout mechanism so a sticker will not be delivered to its designated transfer positions.

11 Claims, 9 Drawing Figures

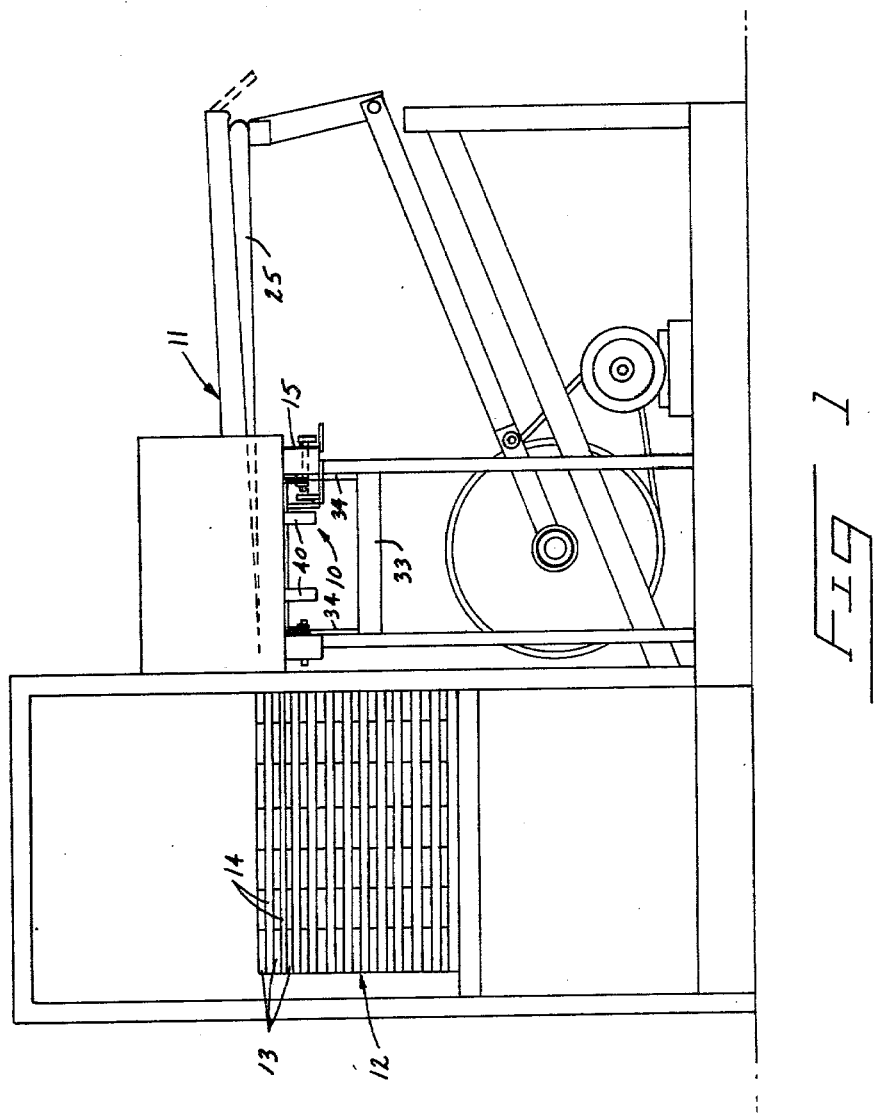

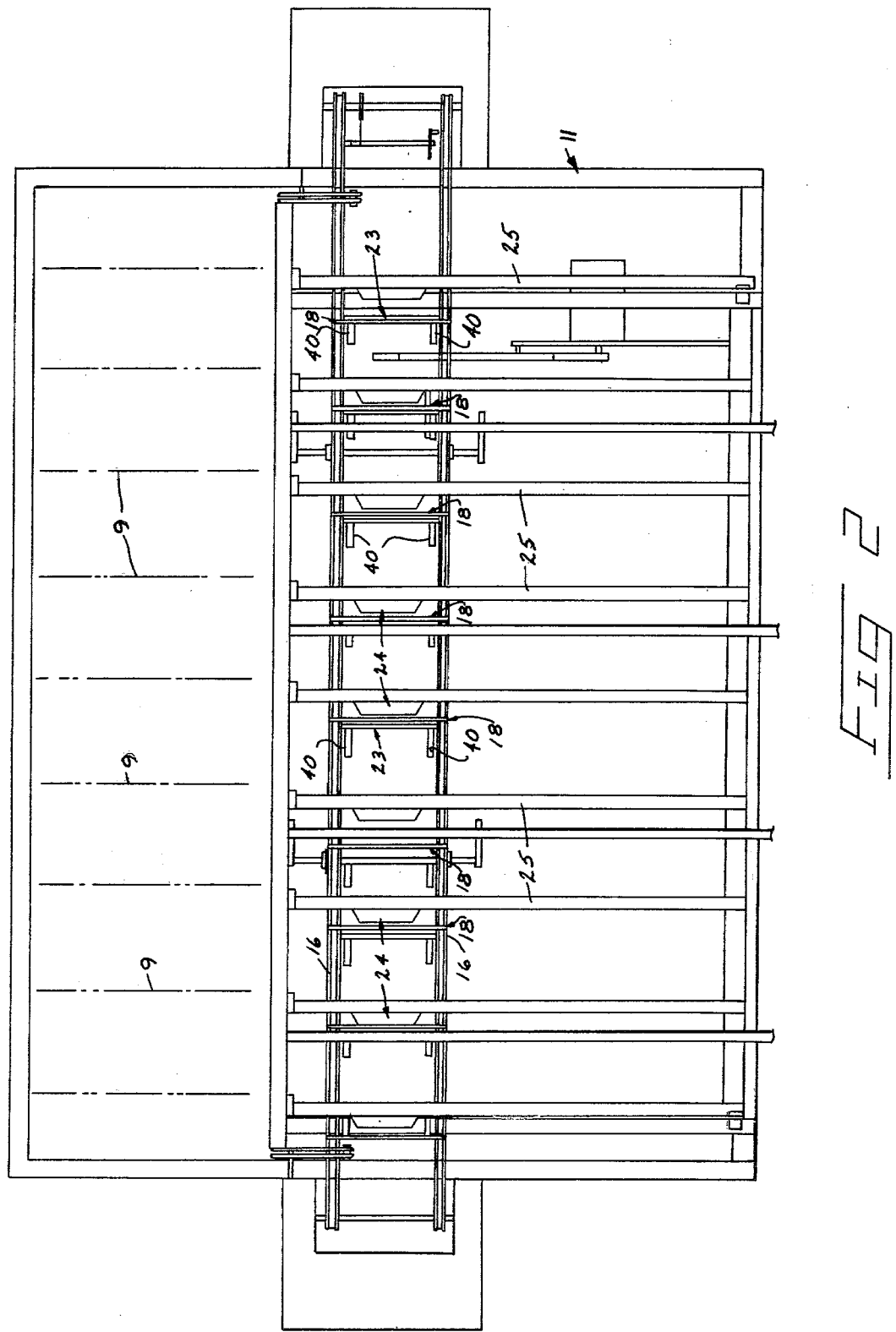

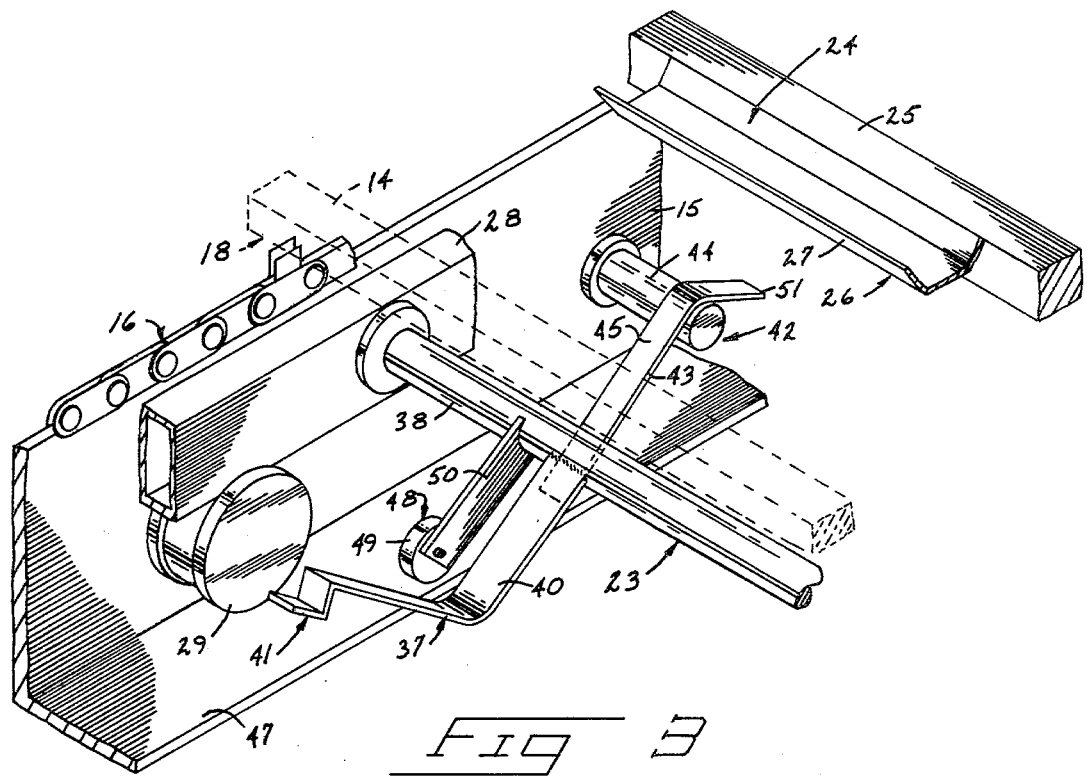
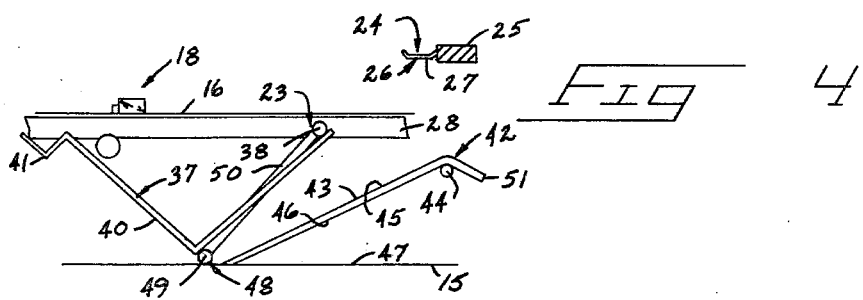
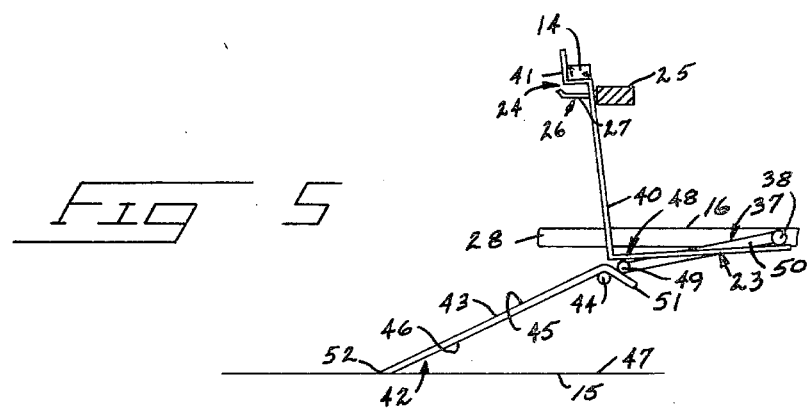

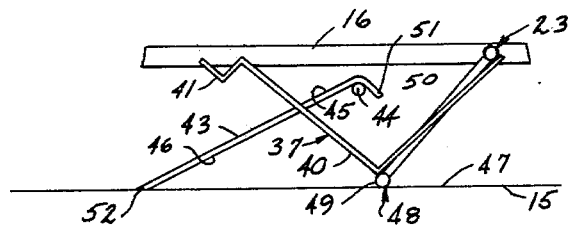
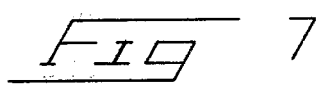
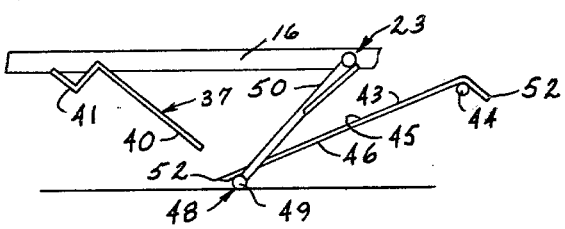
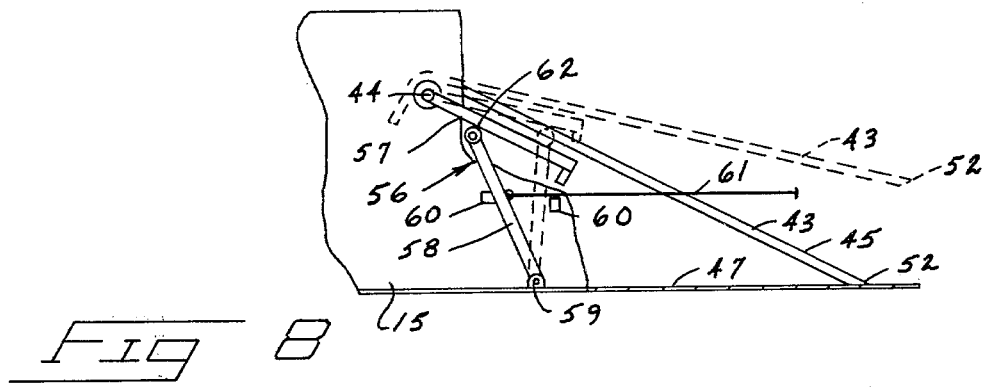
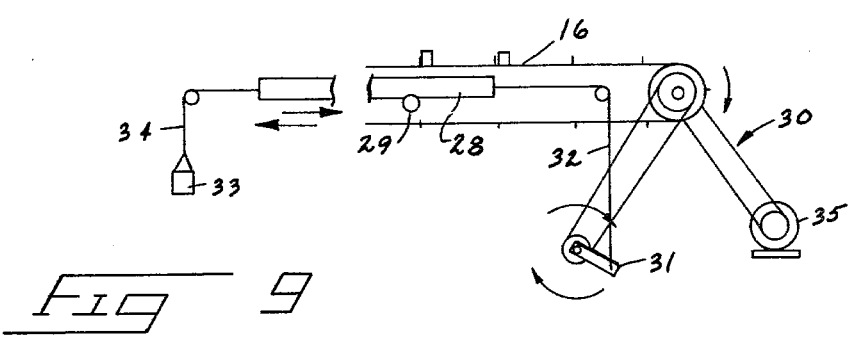

STICKER PLACING APPARATUS

BACKGROUND OF THE INVENTION

The present invention relates generally to apparatus for placing stickers between successive layers of boards when a stack of boards is being formed, and more particularly to an apparatus for moving stickers into proper position for placement between the successive layers.

Various types of mechanisms have been used for delivering and placing successive groups of "stickers" or "sticks" (layer separating boards) between the successive layers of boards in a stack as the stack is being formed. U.S. Pat. No. 3,904,044 is illustrative of a stick placing apparatus that is commercially successful for effectively handling stickers in conjunction with a lumber stacker. The patent discloses a stick placing apparatus that operates in conjunction with a layer forming mechanism of the lumber stacking machine. The stickers are delivered by a conveyor to positions along the associated stacking machine. Selected stickers are then lifted and moved longitudinally to intermediate positions between the conveyor and stack. A subsequent longitudinal movement then shifts the stickers and a formed layer onto the stack. This arrangement functions well where boards of constant length are being stacked. However, when board length changes, the number of stickers should also change. Specifically, if the board length becomes shorter, fewer stickers will be required. If the sticker placement is not changed, the stickers normally used at the longer board ends will be dropped to the ground beyond the opposed ends of the shorter boards.

The above problem is recognized in U.S. Pat. No. 3,904,044 by a selectively operable sticker conveyor loading arrangement where the number of sticks fed onto the stick conveyor is controlled. Even so, the operator must become aware in advance of a change in board length so he can make the appropriate adjustment to change spacing of the stickers in time. If this cannot be done in time, and if shorter boards are being received, the sticks that normally would have been placed at the stack ends will be dropped on the ground. This does happen, since in many situations, the board length may change without sufficient notice. Also, it is often difficult for the operator to correctly calculate the number of cycles the stacker will complete before a full layer of the different length boards are received for stacking.

U.S. patent application, Ser. No. 29,631 filed on Apr. 13, 1979 now U.S. Pat. No. 4,253,787, by the applicant discloses a lumber stacker with a modified sticker handling system wherein the stickers are moved to positions directly below the "intermediate" positions on the placing apparatus. The apparatus represents a significant improvement in the technology of sticker placement by eliminating the "intermediate" positions of the stickers. The stickers are moved directly from the conveyor onto a transfer mechanism for shifting the sticks onto the adjacent stack. The transfer mechanism is comprised of an elongated rigid frame with rigid upwardly projecting sticker end supports affixed thereto. The frame is moved in an arc by a set of crank arms to elevate the frame and supports simultaneously to engage selected stickers on an overhead conveyor, and to lift the engaged stickers onto a sticker depositing mechanism. The frame and crank arms are then returned along the same arc to the beginning position. Changes in sticker placement on the adjacent stack is accomplished as described in U.S. Pat. No. #3,904,044, by controlling sticker feed to the distribution conveyor. The amount of sticker handling and mechanism involved is therefore reduced substantially. The sticker placement problem, though not as complex as above, still remains. The operator must know in advance that the board length is going to change in order to properly adjust the number of sticks placed at the "intermediate positions" for delivery to the stack.

The present invention includes the advantages of the sticker placing apparatus referred to above, plus the added advantage of control mechanisms to allow changing of sticker placement below the successive layers as the lengths of boards in the layer are changed. Any unused stickers are delivered to a location clear of the lumber stack.

An additional advantage of this invention is to provide a sticker placing apparatus that is more compact and operates more efficiently in a smaller vertical space.

BRIEF DESCRIPTION OF THE DRAWINGS

A preferred form of the present invention is illustrated in the accompanying drawings in which:

FIG. 1 is a side elevation view of a stacking machine used in conjunction with the present sticker placing apparatus;

FIG. 2 is a top plan view of the machine shown in FIG. 1;

FIG. 3 is a fragmented pictorial view of the present sticker placing apparatus;

FIGS. 4 through 7 are diagrammatic operational views showing the present apparatus being used to load a sticker onto a sticker depositing mechanism;

FIG. 8 is a detail view of a lockout mechanism; and

FIG. 9 is a diagrammatic view of a drive mechanism for the present apparatus.

DETAILED DESCRIPTION OF A PREFERRED EMBODIMENT

The present sticker placing apparatus is generally indicated in the drawings by the reference character 10 in conjunction with a lumber stacking machine 11. The stacking machine 11 is used to automatically form a stack 12 of a plurality of boards. The stack 12 is arranged with the boards collected in successive layers 13. The individual layers 13 may be separated by stickers 14. The stickers 14 are arranged transverse to the longitudinal orientation of boards within the stack. They extend from one longitudinal side of the stack to the other and are spaced at selected "sticker intervals" 9 (FIG. 2) along the stack length. The sticks 14 provide air spaces between adjacent board layers that allow the boards to dry evenly. It is the purpose of the present apparatus to automatically feed the stickers for placement between the successive board layers 13.

The present stick placing apparatus includes a rigid stationary frame 15 that is situated adjacent the stack 12. The frame 15 may be an integral part of the stacker 11 or can be supplied as an attachment or placed adjacent to the stacker frame. In this embodiment the frame 15 extends across the width of the stacking machine 11 parallel to the lengths of the boards being received thereon.

A sticker distribution conveyor 16 is mounted on the frame and extends from a sticker magazine to a plurality of spaced sticker stations 18 where the stickers are removed for placement onto a sticker depositing means 25 (FIG. 2). The distance between sticker stations 18 on the conveyor corresponds to the selected sticker intervals substantially equaling the desired spacing between stickers on each layer of the adjacent stack. The distribution conveyor 16 is used to receive a number of stickers from the magazine and to distribute the stickers individually to the several sticker stations 18. This is accomplished in timed relation to the cyclical motion of fork arms 25 that are used to receive successive layers of boards and for moving the boards onto the stack.

A sticker transfer means 23 is shown on the frame for removing stickers from the distribution conveyor 16 and lifting the stickers up and laterally to sticker transfer positions 24 (FIG. 5). The stickers in the transfer positions 24 are oriented transverse to the elongated dimension of boards. In this embodiment, the transfer positions are below the layer of boards being formed on the stacker 11.

A sticker depositing means 26 is provided to receive the sticks at the transfer positions 24 and to move the sticks in a direction longitudinally of their lengths onto the stack 12. The sticker depositing means 26 may simply be comprised of a number of trays 27 mounted to the fork arms 25 of the lumber stacking machine 11. The trays receive the successive groups of stickers and hold the stickers against the underside of the layer being placed on the stack and operate in unison with the fork arms to move a layer of boards up and outwardly over the stack. The board layer and stickers are then stripped together onto the top layer of the stack. Further details of the fork arm arrangement and associated mechanism may be understood from U.S. Pat No. 3,904,044 which is hereby incorporated by reference into the present application.

It is understood that the sticker depositing means 26 need not necessarily form a part of the fork arm structure. The frame 15 may be supplied independently of the stacking machine to be placed on the opposite side from the stacking machine. In such a situation, the stick depositing means 26 would be driven separately from the stacking machine but controlled to operate in response to operation of the stacking machine to interpose the stickers between desired board layers.

The sticker transfer means 23 is shown in detail by FIGS. 3 through 8. The transfer means 23 includes a carriage 28 that is elongated to extend along frame 15 between the successive sticker stations 18. It is movably mounted to the frame 15 for linear reciprocating movement along a path that is parallel with the conveyor 16. The carriage 28 is preferably supported on the frame 15 by rollers 29 (FIG. 3). The rollers 29 permit horizontal reciprocating motion of the carriage relative to the general framework 15.

A drive means 30 is provided to cause reciprocating motion of the carriage 28 back and forward in forward and return strokes along the reciprocating path. The drive means 30 may include a crank arm 31 connected by a chain 32 to the carriage 28. The crank arm 31 is preferably driven to rotate by the same mechanisms utilized to drive the sticker distribution conveyor 16. The mechanism utilized to drive the conveyor 16 may be integrated with the driving mechanisms for the stacking machine, or can be supplied as a separate unit such as the motor shown at 35 (FIG. 9). The crank arm 31 will rotate about its central axis in full 360° circles. The chain 32 is therefore alternately pulled forward (moving the carriage through its forward stroke) and is then allowed to move rearward. The rearward movement or return stroke of the carriage 28 and chain is caused by a counterweight 33 connected by a chain 34 to an opposite end of the carriage. The counterweight acts against the crank mechanism when the carriage is being pulled forwardly along its forward stroke. The counterweight pulls the carriage 28 rearward in its return stroke as the crank arm continues to move about its circular path. It is noted that the carriage drive and conveyor drive are common. This allows timing of the reciprocating motion of the carriage 28 to be set relative to the removal of the stickers from the conveyor.

The sticker transfer means includes a plurality of sticker pickup assemblies 37 (FIGS. 2 through 5). The sticker pickup assemblies 37 are mounted to the carriage 28 for translational movement therewith. In addition, the pickup assemblies are vertically movable with respect to the carriage 28 between the sticker stations 18 and the sticker transfer positions 24. The pickup assemblies 37 are mounted to the carriage at spaced intervals corresponding to the sticker stations 18.

The assemblies 37 include a number of pivot shafts 38 extending across the carriage frame 28. The pivot shafts 38 rotate freely on the frame 28 about axes that are parallel to the stickers on conveyor 16. Sticker support arms 40 extend outwardly of the pivot shafts 38. The arms 40 include angular pockets 41 at outward ends thereof that are complementary in cross-section to the individual stickers. The pivot shafts and support arms 40 are arranged so the pockets 41 are moved vertically between the sticker stations 18 and the transfer positions 24.

The pivotal motion is accomplished in response to reciprocating motion of the carriage by a cam means shown generally at 42. Basically, the cam means 42 is provided on the frame 15 in the reciprocating path of the assemblies to engage the individual pickup assemblies as they are moved in the forward stroke of the carriage. The cam means serves to move the pockets 41 elevationally upward from the sticker stations 18 to the sticker transfer positions 24. During the vertical movement, the pockets 41 of each operative assembly 37 engage and lift a sticker from a respective sticker station 18 and carry it upwardly and laterally from the sticker station to the associated sticker transfer position 24.

The cam means 42 preferably includes a plurality of inclinced ramps 43 corresponding to the assemblies 37. The ramps 43 are mounted by pivots 44 to the stationary frame 15. The ramps will therefore remain stationary relative to the linearly reciprocating carriage but are capable of pivoting relatively freely on the frame 15 about the axes of pivots 44. The ramp pivot axes are parallel to the axes of the pivot shafts 38.

The individual ramps 43 include upwardly inclined pivot ramp surfaces 45 and downwardly inclined back ramp surfaces 46. An end 51 of each ramp is spaced above a stationary track 47 on the frame 15. A forward end 52 of the ramp normally rests against the track 47 but will pivot elevationally about a horizontal axis of a pivot 44. The pivots 44 are situated upwardly of the track 47 so that the forward end 52 may pivot upward clear of the track 47.

The cam means 42 includes a cam follower means 48 associated with each sticker pickup assembly that functions to move along the ramp surface 45 to pivot the arm 40 upward to lift a sticker from the conveyor and move the sticker laterally to the sticker transfer position and then to move down the ramp and off the end 51 of the ramp to lower the arm 40 below the conveyor. During the return stroke of the carriage, the follower means moves underneath the ramp and engages the back ramp surface 46 to pivot the forward end 52 of the ramp upward. The follower assemblies ride along the track 47 during the return stroke of the carriage means.

The follower means 48 is comprised of rollers 49 mounted by crank arms 50 to the pivot shafts 38. The rollers 49 free wheel at ends of the crank arms 50 below the stick support pockets 41. The rollers 49 are positioned along the length of the shafts 38 so they will normally rest on the track 47 or move over the ramps 43. The rollers 49 are moved under the ramp ends 51 to engage the bottom surface 46 of the ramps. The rollers 49 operate to pivot the ramps 43 upwardly during continued rearward movement of the carriage in its return stroke. The ramps 43 pivot freely upward about their axes permitting the rollers 49 to return to their original beginning positions without moving the sticker end support arms 40. The ramp ends 52 drop back onto the tracks 47 as the rollers move on to their initial starting positions.

FIG. 8 illustrates a lockout means 56 that is used to selectively lock the ramps in their inoperative positions (with forward ends 52 elevated above the rollers 49) so the sticker pickup assemblies will remain in their normal inoperative positions during both the forward and return strokes of the carriage.

The lockout means 56 includes an inclined arm 57 that is attached to each of the pivot shafts 38. The arm 57 is situated on an opposite side of the frame 15 from the ramp 43. The arm is affixed at its upper end to the associated pivot 44. A lever 58 is mounted to the frame below the inclined arm 57. The lever 58 pivots at 59 between stops 60 on the frame. An actuator (pull rod) 61 is attached to the lever to selectively pivot it from one extreme position to the other.

An upward end of the lever 58 may include a roller 62 that engages the inclined arm 57. Pivotal motion of the lever causes the end to cam against the inclined arm 57 and lift it upwardly about the axis of the pivot 44. This causes upward pivotal movement of the associated ramp 43, elevating its forward end 52 to a position above the follower roller 49. Reciprocation of the carriage will thus result in the associated follower rolling along the track 47 with the pickup assembly remaining inoperative.

During operation, stickers are delivered steadily from the magazine onto the sticker distribution conveyor 16. The conveyor then operates to incrementally move the stickers to the sticker stations. It is preferable that the conveyor be indexed in increments and, for each incremental movement, the transfer means 24 moves through a complete cycle. Thus, as the working flight of the conveyor is indexed forwardly, the carriage frame 28 is moved through its forward stroke and its return stroke to the initial beginning position.

As the carriage begins its forward stroke, the follower rollers 49 engage the operative ramps 43 and roll upwardly with the horizontal reciprocating motion of the carriage. Such upward movement causes upward pivotal movement of the sticker support arms 40. The sticker receiving pockets 41 are therefore pivoted upwardly to engage and lift stickers from the sticker stations 18 on the conveyor (FIG. 5). The upward motion is continued during the forward stroke of the carriage. The stickers are therefore delivered laterally and upwardly to the sticker depositing means 26 at the sticker transfer position 24.

At the end of the forward stroke, the rollers 49 move down the ramps and drop off the elevated ramp ends 51 (FIG. 6). This causes a quick, downward pivotal movement of the sticker end support arms 40 past the sticker depositing means 26. The stickers are therefore lowered onto the trays 27 of the depositing means 26. The pockets continue to pivot on downwardly to inoperative positions elevationally below the conveyor 16. The carriage 28 is then moved back along its return stroke.

During the return stroke the rollers 49 ride along the flat horizontal track 47. The rollers 49 move under the ramp ends 51 to engage the bottom ramp surfaces 46 (FIG. 6). The ramps are thus lifted upwardly by the rollers as the carriage continues to move along its return stroke, returning the followers to their initial starting positions. The forward ramps ends 52 will drop back onto the track 47 as the followers move to the original, starting positions. This completes a full cycle operation of the transfer means.

If the operator of the stacking machine suddenly notices that the board length has changed, (say, for example, from 16' to 12;) he can then operate the selected actuators 61 to "lockout" selected transfer mechanisms so that stickers will not be delivered to the sticker transfer positions previously used at the ends of the 16' boards. Instead, the ramps 43 are pivoted upwardly and the associated followers move by on the track 47 during the reciprocating motion of the carriage, without producing vertical motion of the associated pickup assembly. The stickers situated on the conveyor at the selected sticker locations will not be lifted and placed on the delivery means by the sticker pickup assembly. Instead, they will be indexed successively along the length of the conveyor until discharged from the conveyor end at a location to one side of the stacking machine that does not hamper efficient operation of the stacking machine.

The above description and attached drawings are given by way of example to set forth a preferred form of the present invention. Other forms may be envisioned which fall within the scope of the present invention as set forth by the following claims.

What we claim is:

1. Sticker placing apparatus for use in conjunction with lumber stacking equipment for forming a stack of boards having a plurality of superimposed layers of elongated boards, in which selected layers are separated by stickers that are oriented transversely to the elongated dimension of the boards at desired sticker intervals along the length of the boards, said sticker placing apparatus comprising:
   a frame adjacent the stack;
   an elongated sticker distribution conveyor mounted on the frame and extending from a sticker magazine to a plurality of spaced sticker stations spaced along one side of the stack corresponding to the desired sticker intervals for receiving a plurality of stickers from the magazine means and distributing the stickers individually to the sticker stations alongside the stack;
   a sticker transfer means movably mounted on the frame for removing stickers from the elongated sticker distribution conveyor and lifting the stickers upward and laterally to sticker transfer positions in which the stickers are positioned transverse to the elongated dimension of the boards in the stack;

sticker depositing means movably mounted on the frame for receiving the stickers at the sticker transfer positions and moving the stickers longitudinally over the stack and depositing the stickers between the selected layers of boards;

wherein the sticker transfer means includes:

an elongated carriage extending between the sticker stations and movably mounted on the frame for linear reciprocating movement on the frame substantially parallel with the elongated sticker distribution conveyor;

a plurality of sticker pickup assemblies mounted on the frame at spaced locations corresponding to the desired sticker intervals for reciprocating movement with the carriage in prescribed reciprocating paths between the sticker stations and the sticker transfer positions;

each of said sticker pickup assemblies being movably mounted on the carriage for vertical movement between the sticker stations and the sticker transfer positions;

drive means operatively connected to the elongated carriage for linearly reciprocating the carriage to move the sticker pickup assemblies in a forward stroke from the sticker stations to the sticker transfer positions and move the sticker pickup assemblies in a return stroke from the sticker transfer positions to the sticker stations; and cam means mounted in the prescribed reciprocating paths of the sticker pickup assemblies for engaging the sticker pickup assemblies as the sticker pickup assemblies are moved in a forward stroke and moving the assemblies elevationally upward from the sticker stations to the sticker transfer stations to pick up the stickers at the sticker stations and to carry the stickers upward and laterally from the sticker stations to the sticker transfer positions.

2. The sticker placing apparatus as defined in claim 1 wherein the sticker pickup assemblies include pivotally mounted sticker supports for removing the stickers from the elongated conveyor and pivoting the stickers upward and laterally to the sticker transfer positions.

3. The sticker placing apparatus as claimed in claim 1 wherein the sticker pickup assemblies include sticker supports for each sticker station, each pivotally mounted to the carriage frame independently of the remaining sticker supports and wherein a cam means is provided for each sticker support.

4. The sticker placing apparatus as claimed by claim 1 wherein the cam means is comprised of an inclined ramp on the frame adjacent the carriage frame;

and follower means mounted to the sticker pickup assemblies for moving up the ramp on the forward stroke of the carriage to thereby cause upward movement of the sticker pickup assemblies to the sticker transfer positions.

5. The sticker placing apparatus as claimed by claim 4 wherein the inclined ramp includes an elevated end placed in relation to the forward stroke of the carriage so the followers will drop off the elevated ramp end at the end of the forward stroke of the carriage, thereby causing the sticker pickup assemblies to move downwardly to inoperative positions below the sticker transfer positions.

6. The sticker placing apparatus as claimed by claim 5 wherein the inclined ramp is pivoted adjacent its elevated end and includes a downwardly facing cam surface to be engaged and lifted by the follower as the carriage is moved along its return stroke to thereby allow the sticker pickup assemblies to remain in their inoperative positions during the return carriage stroke.

7. The sticker placing apparatus as claimed by claim 6 wherein the sticker pickup assemblies include sticker supports for each sticker station, each pivotally mounted to the carriage frame independently of the remaining sticker supports and wherein a cam means is provided for each sticker support.

8. The sticker placing assembly as claimed by claim 7 further comprising cam lockout means selectively operable to lock the ramps in inoperative positions so the sticker pickup assemblies will remain in their inoperative positions during the forward and return strokes of the carriage.

9. The sticker placing assembly as claimed by claim 1 further comprising cam lockout means on the frame for selectively preventing vertical movement of the sticker pickup assemblies during reciprocating movement thereof.

10. The sticker placing assembly as claimed by claim 3 further comprising cam lockout means on the frame for selectively preventing vertical movement of the sticker pickup assemblies during reciprocating movement thereof.

11. The sticker placing assembly as claimed by claim 1 wherein the sticker pickup assemblies are each comprised of a pivot shaft mounted to the carriage for pivotal movement about an axis parallel to stickers, and sticker supports mounted to the shaft; and wherein the cam means includes inclined ramps on the frame, and followers extending from the pivot shafts in alignment along the reciprocating path with the ramps so when the carriage is moved in its forward stroke, the followers move up the ramps and cause upward pivotal movement of the sticker supports.

* * * * *